(12) United States Patent
Ishii et al.

(10) Patent No.: US 9,193,102 B2
(45) Date of Patent: Nov. 24, 2015

(54) METHOD OF MAKING AND RECYCLING A GOLF BALL

(75) Inventors: Hideyuki Ishii, Portland, OR (US); Yasushi Ichikawa, Tualatin, OR (US); Arthur Molinari, Portland, OR (US); Bradley C. Tutmark, Aloha, OR (US); Takahisa Ono, Fujisawa (JP)

(73) Assignee: NIKE, Inc., Beaverton, OR (US)

( * ) Notice: Subject to any disclaimer, the term of this patent is extended or adjusted under 35 U.S.C. 154(b) by 429 days.

(21) Appl. No.: 13/485,619

(22) Filed: May 31, 2012

(65) Prior Publication Data

US 2013/0320577 A1 Dec. 5, 2013

(51) Int. Cl.
*B29C 73/00* (2006.01)
*B29C 45/16* (2006.01)
*B29B 17/04* (2006.01)
*A63B 45/00* (2006.01)
*B29L 31/54* (2006.01)
*B29B 17/02* (2006.01)
*A63B 37/00* (2006.01)

(52) U.S. Cl.
CPC ............... *B29C 45/16* (2013.01); *A63B 45/00* (2013.01); *B29B 17/0404* (2013.01); *A63B 37/0075* (2013.01); *A63B 37/0076* (2013.01); *A63B 2209/00* (2013.01); *B29B 2017/0203* (2013.01); *B29B 2017/0244* (2013.01); *B29C 45/1642* (2013.01); *B29L 2031/546* (2013.01); *Y02W 30/524* (2015.05); *Y02W 30/622* (2015.05); *Y02W 30/625* (2015.05)

(58) Field of Classification Search
CPC . A63B 45/00; B29B 2017/0244; B29C 45/16

USPC ................ 264/36.12, 328.1, 328.17
See application file for complete search history.

(56) References Cited

U.S. PATENT DOCUMENTS

| | | | |
|---|---|---|---|
| 696,351 | A | 3/1902 | Richards |
| 2,083,155 | A | 6/1937 | Leguillon |
| 2,258,333 | A | 10/1941 | Miller |
| 5,150,906 | A | 9/1992 | Molitor et al. |
| 5,566,832 | A | 10/1996 | Stueckrad et al. |
| 5,566,889 | A | 10/1996 | Preiss |
| 5,645,786 | A | 7/1997 | Okada et al. |
| 5,783,293 | A | 7/1998 | Lammi |
| 6,033,611 | A | 3/2000 | Yamaguchi |

(Continued)

FOREIGN PATENT DOCUMENTS

| | | |
|---|---|---|
| JP | 6285856 A | 10/1994 |
| WO | WO0057962 A1 | 10/2000 |
| WO | WO0124888 A1 | 4/2001 |

*Primary Examiner* — James Sanders
(74) *Attorney, Agent, or Firm* — Honigman Miller Schwartz & Cohn LLP; Anna M. Budde; Jonathan P. O'Brien (57) ABSTRACT

A method of making and recycling a golf ball is disclosed. The method may include processing a used golf ball to make the materials of the used golf ball reusable in a new golf ball. As a result, the disclosed method may decrease the waste of disposing of used golf balls and the costs associated with acquiring and/or processing new materials. The method of recycling a golf ball may generally include pulverizing used golf balls into particles. The used golf balls may be made of materials having different densities. The particles may be placed in a liquid that causes the particles of different materials to float to different levels based on the densities of the materials. At least a portion of the particles may be melted and injected into a sandwich mold to create a new golf ball.

14 Claims, 6 Drawing Sheets

(56) References Cited

U.S. PATENT DOCUMENTS

| | | |
|---|---|---|
| 6,120,714 A | 9/2000 | Allan et al. |
| 6,129,881 A | 10/2000 | Puniello |
| 6,338,840 B1 | 1/2002 | Allan et al. |
| 6,575,728 B2 | 6/2003 | Brum |
| 6,607,123 B1 * | 8/2003 | Jollifee et al. ............... 235/375 |
| 6,612,941 B2 | 9/2003 | Kennedy, III et al. |
| 6,676,541 B2 | 1/2004 | Cavallaro et al. |
| 6,692,380 B2 | 2/2004 | Sullivan et al. |
| 6,703,005 B2 | 3/2004 | Allan et al. |
| 6,716,954 B2 | 4/2004 | Keller et al. |
| 6,802,785 B2 | 10/2004 | Jordan et al. |
| 6,852,042 B2 | 2/2005 | Sullivan et al. |
| 6,939,907 B2 * | 9/2005 | Rajagopalan et al. ........ 524/322 |
| 7,029,614 B2 | 4/2006 | Tanaka et al. |
| 7,090,592 B2 | 8/2006 | Watanabe et al. |
| 7,261,535 B2 | 8/2007 | Puniello et al. |
| 7,335,326 B2 | 2/2008 | Brum |
| 7,407,378 B2 | 8/2008 | Brum |
| 7,862,760 B2 | 1/2011 | Puniello et al. |
| 7,874,940 B2 | 1/2011 | Kim et al. |
| 7,950,525 B2 * | 5/2011 | Koslow ........................ 209/169 |
| 8,012,044 B2 | 9/2011 | Kennedy, III et al. |
| 2010/0004069 A1 | 1/2010 | Hebert et al. |
| 2010/0029412 A1 | 2/2010 | Simonutti et al. |
| 2010/0056305 A1 * | 3/2010 | Hebert et al. ................. 473/409 |
| 2011/0152008 A1 | 6/2011 | Kim et al. |
| 2012/0040775 A1 | 2/2012 | Ichikawa |
| 2012/0122609 A1 * | 5/2012 | Egashira et al. .............. 473/372 |

* cited by examiner

METHOD OF MAKING AND RECYCLING A GOLF BALL

BACKGROUND

The present invention relates generally to a method of making and recycling a golf ball.

The game of golf is an increasingly popular sport at both amateur and professional levels. A wide range of technologies related to the manufacture and design of golf balls are known in the art. Such technologies have resulted in golf balls with a variety of play characteristics. For example, some golf balls have a better flight performance than other golf balls. Some golf balls with a good flight performance do not have a good feel when hit with a golf club. While materials have advanced to increase the performance of golf balls, the materials are not always easy to recycle. Thus, to help manage costs and reduce damage to the environment, it would be advantageous to reuse a golf ball to make a new golf ball.

SUMMARY

Generally, the present disclosure presents a method of making and recycling a golf ball. The method may include processing a used golf ball to make the materials of the used golf ball reusable in a new golf ball. As a result, the disclosed method may decrease the waste of disposing of used golf balls and the costs associated with acquiring and/or processing new materials. The method of recycling a golf ball may generally include pulverizing a used golf ball into particles. The used golf ball may be made of materials having different densities. The particles may be placed in a liquid that causes the particles of different materials to float to different levels based on the densities of the materials. This phenomenon may facilitate separating the particles of different materials. The particles may be removed from the liquid while keeping like particles together and keeping different particles separate. Then, the particles may be dried and at least a portion of the particles may be reused in a new golf ball. The particles may be melted and injected into a sandwich mold to create a new golf ball.

In one aspect, the disclosure provides a method of making a golf ball. The method may include a step of injecting a first molten material into a mold chamber, thereby forming a cover layer. The method may include a step of injecting a second molten material into the mold chamber, thereby forming a mantle layer within the cover layer. The method may include a step of injecting a third molten material into the mold chamber, thereby forming a core layer within the mantle layer. The method may include a step delivering particles of a first material to a first heating chamber. The method may include a step of heating the particles of the first material, thereby melting the particles of the first material into the first molten material. The method may include a step of loading the particles of the first material into a first hopper. The method may include a step of delivering particles of a second material to a second heating chamber. The method may include a step of heating the particles of the second material, thereby melting the particles of the second material into the second molten material. The method may include a step of loading the particles of the second material into a second hopper. The method may include a step of delivering particles of a third material to a third heating chamber. The method may include a step of heating the particles of the third material, thereby melting the particles of the third material into the third molten material. The method may include a step of loading the particles of the third material into a third hopper.

In one aspect, the disclosure provides a method of making a golf ball. The method may include a step of pulverizing a golf ball into particles. The method may include a step of placing the particles into a liquid, thereby causing a first group of particles to settle at a first level and a second group of particles to settle at a second level that is different from the first level. The first group of particles may be of a material having a different density than the density of the material of the second group of particles. The method may include a step of using at least a portion of one of the first group of particles and the second group of particles to form a new golf ball. The method may include a step of removing the first group of particles while keeping the first group of particles separate from the second group of particles. The method may include a step of storing the first group of particles separately from the second group of particles. The method may include a step of removing the second group of particles while keeping the second group of particles separate from the first group of particles. The method may include a step of storing the second group of particles separately from the first group of particles. The method may include a step of agitating the liquid to aid in separating the particles of both the first group and the second group. The method may include a step of drying the first group of particles and a step of drying the second group of particles.

In one aspect, the disclosure provides a method of making a golf ball. The method may include a step of pulverizing a golf ball into particles. The method may include a step of placing the particles into a liquid, thereby causing a first group of particles to settle at a first level and a second group of particles to settle at a second level that is different from the first level. The first group of particles may be of a material having a different density than the density of the material of the second group of particles. The method may include a step of removing a first group of particles while keeping the first group of particles separate from the second group of particles. The method may include a step of removing a second group of particles while keeping the second group of particles separate from the first group of particles. The method may include a step of using at least a portion of one of the first group of particles and the second group of particles to form a new golf ball. The step of using at least a portion of one of the first group of particles and the second group of particles to form a new golf ball may include delivering particles of a first material to a first heating chamber and heating the particles of the first material, thereby melting the particles of the first material into a first molten material and injecting a first molten material into a mold chamber, thereby forming a cover layer. The step of using at least a portion of one of the first group of particles and the second group of particles to form a new golf ball may include delivering particles of a second material to a second heating chamber and heating the particles of the second material, thereby melting the particles of the second material into the second molten material and injecting a second molten material into a mold chamber, thereby forming a mantle layer within the cover layer.

The step of removing the first group of particles may include skimming the first group of particles from the liquid. The step of removing the first group of particles may include forcing the first group of particles from a vessel into a dryer. In some embodiments, a tube may connect the vessel to the dryer. The step of using at least a portion of one of the first group of particles and the second group of particles to form a new golf ball may include injecting a third molten material into the mold chamber, thereby forming a core layer within the mantle layer.

In one aspect, the disclosure provides a method of making a golf ball. The method may include a step of selling a golf ball having a trace element to a consumer. The method may include a step of collecting the golf ball and inputting the trace element data into a computer program. The method may include a step of calculating with the computer program an incentive award associated with the collected golf ball. The method may include a step of communicating the award to a user. The method may include a step of pulverizing a golf ball into particles. The method may include a step of separating the particles of the golf ball into a first group of particles and a second group of particles. The method may include a step of using at least a portion of one of the first group of particles and the second group of particles to form a new golf ball.

The step of separating the particles may include placing the particles into a liquid, thereby causing the first group of particles to settle at a first level and the second group of particles to settle at a second level that is different from the first level. The first group of particles may be of a material having a different density than the density of the material of the second group of particles. The method may include a step of removing a first group of particles while keeping the first group of particles separate from the second group of particles. The method may include a step of removing a second group of particles while keeping the second group of particles separate from the first group of particles.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, the present disclosure relates to a method of making and recycling a golf ball. In this disclosure, the terms "used golf ball" and "new golf ball" are used to distinguish between a golf ball that is to be recycled and a golf ball that is made from recycled materials. Accordingly, "used golf ball" means a golf ball that is to be recycled. The term "used golf ball" can include golf balls that have literally been used in a golf game and golf balls that have not literally been used. "New golf ball" refers to a golf ball made from materials recycled from the "used golf ball."

Figure 1:
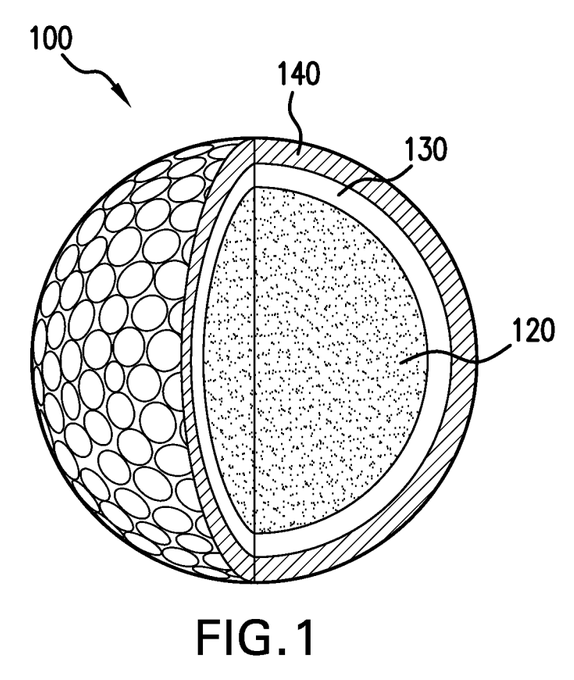
FIG. 1 is a golf ball according to an exemplary embodiment.

FIG. 1 shows an exemplary embodiment of a golf ball 100 that may be made and recycled by the disclosed methods. Golf ball 100 may include a core layer 120, a mantle layer 130, and a cover layer 140. While the exemplary embodiment of golf ball 100 has been described and illustrated as having three layers, other embodiments may include any number of layers. For example, in some embodiments, golf ball 100 may be a one-piece, two-piece, four-piece, or five-piece ball. In some embodiments, golf ball 100 may include more than five layers. The number of layers may be selected based on a variety of factors. For example, the number of layers may be selected based on the type of materials used to make the golf ball and/or the size of the golf ball.

The type of materials used to make the layers of the golf ball may be selected based on a variety of factors. For example, the type of materials used to make the layers of the golf ball may be selected based on the properties of the material and/or the processes used to form the layers. Exemplary materials are discussed below with respect to the individual layers of the exemplary embodiment. In some embodiments, one or more layers may be made from different materials. In some embodiments, one or more layers may be made from the same materials.

In some embodiments, the materials used to make the layers of the golf ball may be selected to aid in recycling the golf ball. In such embodiments, the materials may be selected to aid in separating and identifying the materials before reusing the materials. This way the materials may be stored separately before using and/or the proper proportions of the materials may be measured out for reusing. For example, in an embodiment in which a used golf ball is made of material A and material B, the used golf ball may be pulverized into particles so that the materials may be reused to make new golf balls and/or other items. Pulverizing the used golf ball may result in particles of material A and material B to become intermixed. If only material A, and not material B, is to be used in a layer of a new golf ball, it may be helpful to be able to separate material A from material B. Similarly, if material A and material B are to be used in a certain proportion in a layer of a new golf ball, it may be helpful to be able to distinguish between material A and material B. Separating and identifying materials may be helpful in recycling golf balls made of any number of materials and during any type of recycling process. For example, separating and identifying materials may be helpful in recycling golf balls made of four different types of materials.

In some embodiments, the density and/or specific gravity of the materials used to make golf ball 100 may be used to separate the materials during recycling. Specific gravity is the ratio of the density of a substance compared to the density of fresh water at 4° C. (39° F.). At this temperature the density of water is at its greatest value and equal 1 g/cm³. Since specific gravity is a ratio, specific gravity is dimensionless. An object will float in water if its density is less than the density of water and sink if its density is greater than the density of water. Thus, an object with a specific gravity less than 1 will float in water and an object with a specific gravity greater than one will sink in water. The same principle may be applied to other types of liquids. For example, if the ratio of the density of an object to the density of a liquid is less than 1, the object will float in that particular liquid. In some cases, the density of an object may cause the object to become suspended at a certain level within the liquid. The ratio of the density of the object to the density of the liquid may dictate the level to which the object is suspended in that particular liquid. These principles may be used to separate materials having different densities. For example, in some embodiments, golf ball 100 made from materials having different densities. For recycling, golf ball 100 may be pulverized into particles. Then, the particles may be added to a liquid having a certain known density. The liquid and/or the materials may be selected based on their densities. In other words, the materials and/or liquid may be selected based on the levels the particles will float to within the liquid. This way, the particles can be separated based on the level to which the particles float in the liquid. The method of recycling a golf ball is discussed in more detail below with reference to FIGS. 6-7. A used golf ball made by any available method may be recycled by the disclosed method of recycling.

In some embodiments, core layer 120, mantle layer 130, and cover layer 140 may be each made from a single type of material or a composition including multiple materials. In some embodiments, each layer may be made from a thermoplastic such that the materials may be recycled by pulverizing the materials and then melting the materials during sandwich molding to make a new golf ball. For example, core layer 120 may be made from HPF 2000, which has a density of 0.96 g/cm$^3$. Mantle layer 130 may be made from Neothane 6303D, which is the trade name of a thermoplastic polyurethane produced by Dongsung Highchem Co. LTD. Cover layer 140 may be made from PTMEG. "PTMEG" is polytetramethylene ether glycol, commercially available from Invista under the trade name of Terathane® 2000. The density of mantle layer 130 or cover layer 140 may range from about 1.1 g/cm$^3$ to about 1.35 g/cm$^3$.

Pulverizing golf ball 100 of this embodiment into particles and putting the particles in water having a temperature of 4° C. (39° F.) may result in the materials of each layer floating to a different level in the water. The particles may be removed from the water level by level to keep like particles together. For example, particles of HPF 2000 may have the lowest density and may, therefore, float to the top of the water. These particles may be removed first to reveal the next level of particles, which may include the particles having the second lowest density. Then, the particles having the second lowest density may be removed to reveal the next level of particles. In this manner, the particles may be separated into levels and removed level by to level to keep like particles together.

Figure 2:
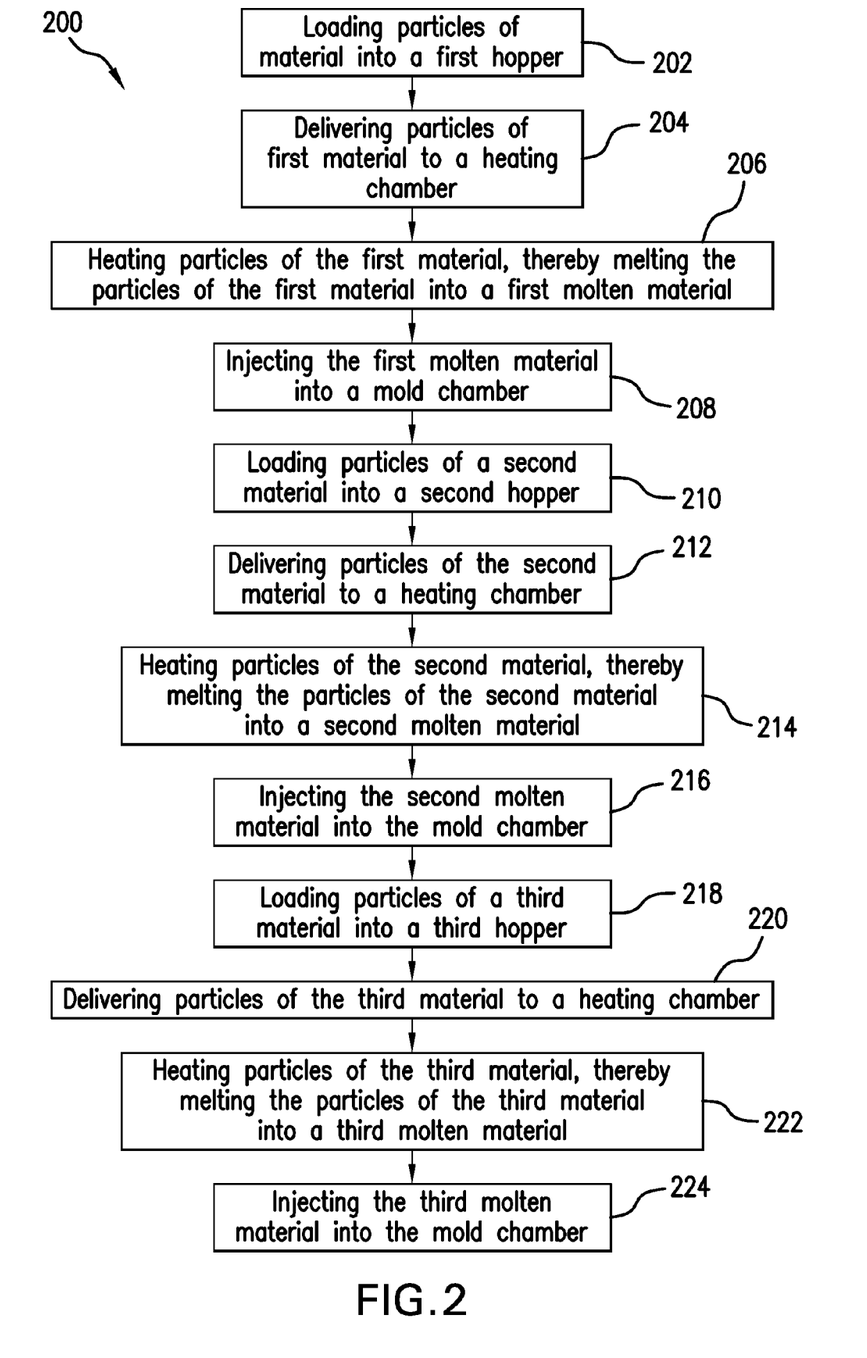
FIG. 2 is a flow chart showing a method of making a golf ball according to an exemplary embodiment.
Figure 3:
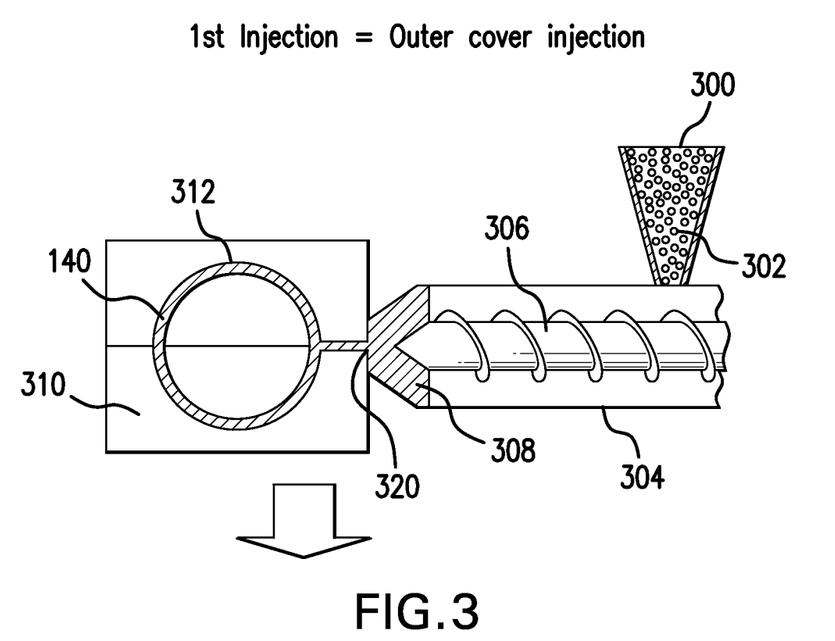
FIG. 3 shows a cover layer of a golf ball being formed.
Figure 4:
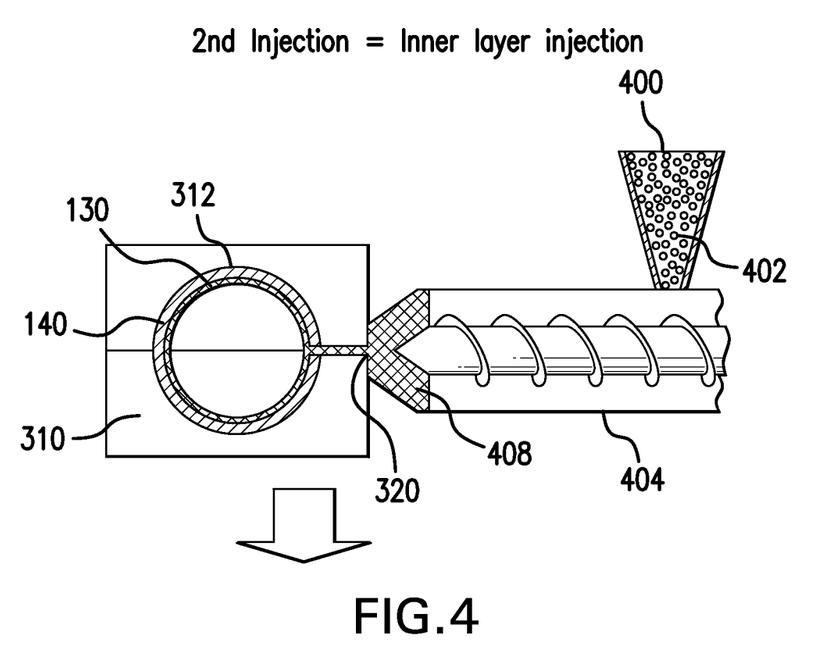
FIG. 4 shows a mantle layer of a golf ball being formed.
Figure 5:
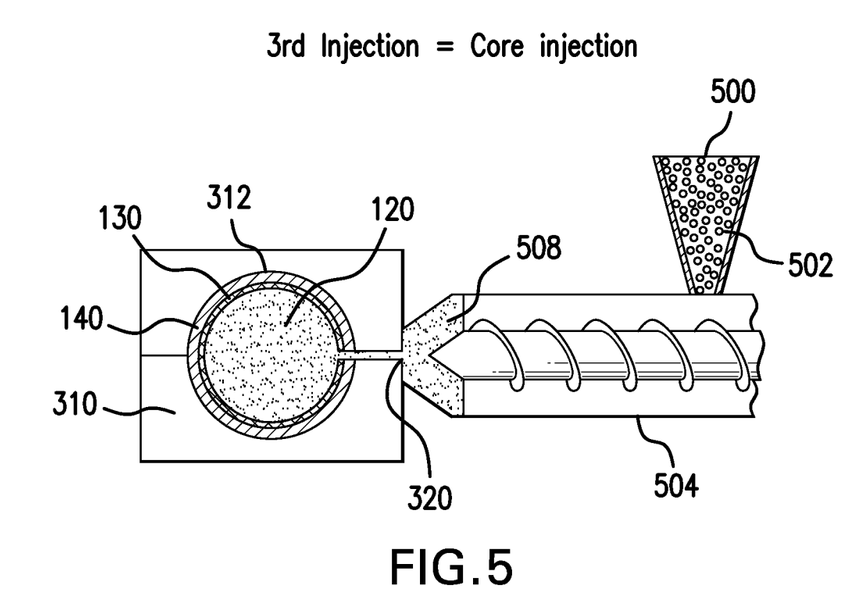
FIG. 5 shows a core layer of a golf ball being formed.

In some embodiments, golf ball 100 may be made with a sandwich injection mold machine. For example, FIGS. 3-5 show components of a sandwich injection mold machine. FIG. 2 is a flowchart showing an exemplary method 200 of making a golf ball. Method 200 may be performed with the components shown in FIGS. 3-5 or components of any other sandwich injection mold machine. For example, method 200 may be performed by the components disclosed in Cavallaro et al., U.S. Pat. No. 6,676,541, entitled Co-Injection Molded Double Covered Golf Ball, issued on Jan. 13, 2004, the entirety of which is hereby incorporated by reference. In another example, method 200 may be performed by the components disclosed in Lammi, U.S. Pat. No. 5,783,293, entitled Golf Ball with a Multi-Layered Cover, issued on Jul. 21, 1998, the entirety of which is hereby incorporated by reference. In yet another example, method 200 may be performed by the components disclosed in Puniello et al., U.S. Pat. No. 7,862,760, entitled Co-Injection Nozzle, Method of its Use, and Resulting Golf Ball, issued on Jan. 4, 2011, the entirety of which is hereby incorporated by reference.

The components shown in FIG. 3 may include a vessel for collecting, storing, and/or dispensing particles of golf ball material. For example, the vessel may be a first hopper 300. First hopper 300 may be connected to a first heating chamber 304. First heating chamber 304 may include an auger 306 for moving material toward an opening of first heating chamber 304. In some embodiments, first heating chamber 304 may include a pump and/or piston instead of or in addition to auger 306. The opening may be aligned with an injection port 320 of a golf ball mold 310 having a mold chamber 312 such that molten material may flow from the opening into mold chamber 312 via injection port 320. Golf ball mold 310 may include two mold cavities that mate together to form mold cavity 312. Mold chamber 312 may include surfaces having the inverse of a substantially spherical shape.

The components shown in FIG. 4 may include a vessel for collecting, storing, and/or dispensing particles of golf ball material. For example, the vessel may be a second hopper 400. Second hopper 400 may be connected to a second heating chamber 404. Second heating chamber 404 may include an auger 406 for moving material toward an opening of second heating chamber 404. In some embodiments, second heating chamber 404 may include a pump and/or piston instead of or in addition to auger 406. The opening may be aligned with injection port 320 such that molten material may flow from the opening into mold chamber 312 via injection port 320.

The components shown in FIG. 5 may include a vessel for collecting, storing, and/or dispensing particles of golf ball material. For example, the vessel may be a third hopper 500. Third hopper 500 connected to a third heating chamber 504. Third heating chamber 504 may include an auger 506 for moving material toward an opening of third heating chamber 504. In some embodiments, third heating chamber 504 may include a pump and/or piston instead of or in addition to auger 506. The opening may be aligned with injection port 320 such that molten material may flow from the opening into mold chamber 312 via injection port 320.

Golf ball 100 may be made by method 200. In some embodiments, method 200 may include a step 202 of loading particles of a first material 302 into first hopper 300. The first material may include materials from which a cover layer may be made during method 200. In some embodiments, particles of first material 302 may include ground material. In some embodiments, particles of first material 302 may include pellets. Method 200 may include a step 204 of delivering particles of first material 302 to a heating chamber. For example, step 204 may include delivering particles of first material 302 to first heating chamber 304. Step 204 may be carried out in a variety of ways. For example, step 204 may be carried out by gravity acting on the particles. In such embodiments, a valve may open and close to let the particles fall into first heating chamber 304. In another example, step 204 may be carried out by pumping materials from first hopper 300 into first heating chamber 304.

In some embodiments, method 200 may include a step 206 of heating particles of first material 302, thereby melting particles of first material 302 into a first molten material 308. Step 206 may be carried out a variety of ways. For example, in some embodiments, step 206 may include raising the temperature of heating elements located within first heating chamber 304 to heat particles of first material 302. In another example, step 206 may include raising the temperature of heating elements surrounding first heating chamber 304.

In some embodiments, method 200 may include a step 208 of injecting first molten material 308 into mold chamber 312. In some embodiments, step 208 may include forcing first molten material 308 toward the opening of first heating chamber 304, through the opening, and through injection port 320. For example, in some embodiments, step 208 may include twisting auger 306 to force first molten material 308 toward the opening of first heating chamber 304. Twisting auger 306 may also force particles of first material 302 toward opening of first heating chamber 304. The particles may be melting as they are being moved toward opening of first heating chamber 304. In another example, a plunger and/or a pump may be used to force first molten material 308 toward the opening, through the opening, and through injection port 320. In some embodiments, both step 206 and step 208 may be performed by twisting auger 306. In such embodiments, the heat generated by the friction caused by twisting auger 306 may melt particles of first material 302. This heat may be used instead of or in addition to any other heat generated within first heating chamber 304 to melt particles of first material 302 into first molten material 308.

In some embodiments, method 200 may include a step 210 of loading particles of a second material 402 into a second hopper 400. Step 210 may be performed in the same manner discussed above with reference to step 202. The second material may include materials from which a mantle layer may be made during method 200. In some embodiments, particles of second material 402 may include ground material. In some embodiments, particles of second material 402 may include pellets. In some embodiments, method 200 may include a step 212 of delivering particles of second material 402 to a heating chamber. For example, step 212 may include delivering particles of second material 402 to second heating chamber 404. Step 212 may be performed in the same manner discussed above with reference to step 204. Method 200 may include a step 214 of heating particles of second material 402, thereby melting particles of second material 402 into a second molten material 408. Step 214 may be performed in the same manner discussed above with reference to step 206. Method 200 may include a step 216 of injecting second molten material 408 into mold chamber 312. Step 216 may be performed in the same manner discussed above with reference to step 208.

In some embodiments, method 200 may include step 218 of loading particles of a third material 502 into a third hopper 500. Step 218 may be performed in the same manner discussed above with reference to step 202. The third material may include materials from which a mantle layer may be made during method 200. In some embodiments, particles of third material 502 may include ground material. In some embodiments, particles of third material 502 may include pellets. In some embodiments, method 200 may include a step 220 of delivering particles of third material 502 to a heating chamber. For example, step 220 may include delivering particles of third material 502 to third heating chamber 504. Step 220 may be performed in the same manner discussed above with reference to step 204. Method 200 may include a step 222 of heating particles of third material 502, thereby melting particles of third material 502 into a third molten material 508. Step 222 may be performed in the same manner discussed above with reference to step 206. Method 200 may include a step 224 of injecting third molten material 508 into mold chamber 312. Step 224 may be performed in the same manner discussed above with reference to step 208.

In some embodiments, step 208, step 216 and step 224 may be performed sequentially in any order. For example, step 208 may be performed about 1 μs to about 5 sec before step 216 is performed. In another example, step 208 may be performed about 1 sec to about 20 sec before step 216 is performed. In some embodiments, step 208, step 216 and step 224 may be performed simultaneously and/or quickly successively. In some embodiments, step 208, step 216 and step 224 may be performed simultaneously and/or quickly successively such that the performances of step 208, step 216, and step 224 overlap. In such embodiments, the components of the sandwich mold equipment may be configured to achieve simultaneous and/or quickly successively injections into mold chamber 312. For example, concentric nozzles may be used to simultaneously injection multiple materials into mold chamber 312. In another example, the components of the sandwich mold may include those disclosed in Cavallaro et al., U.S. Pat. No. 6,676,541, entitled Co-Injection Molded Double Covered Golf Ball, issued on Jan. 13, 2004, the entirety of which is incorporated by reference.

In some embodiments, step 208, step 216, and step 224 may be performed in an order such that molten first material 308 solidifies against the inner surface of mold chamber 312 to form cover layer 140 of golf ball 100. Molten first material 308 may begin to solidify before, during, or after the other materials are injected into mold chamber 312. In some embodiments, step 208, step 216, and step 224 may be performed such that molten second material 408 solidifies against cover layer 140 to form mantle layer 130 of golf ball 100. Molten second material 408 may begin to solidify before, during, or after the other materials are injected into mold chamber 312. In some embodiments, step 208, step 216, and step 224 may be performed such that molten third material 508 solidifies against mantle layer 130 and fills the space inside mantle layer 130 to form core layer 120 of golf ball 100. Molten third material 508 may begin to solidify before, during, or after the other materials are injected into mold chamber 312.

It is understood that any of the steps disclosed above may be performed in any order. For example, step 206 may be performed at the same time as step 208. In another example, step 206 may be performed before step 208.

Figure 6:
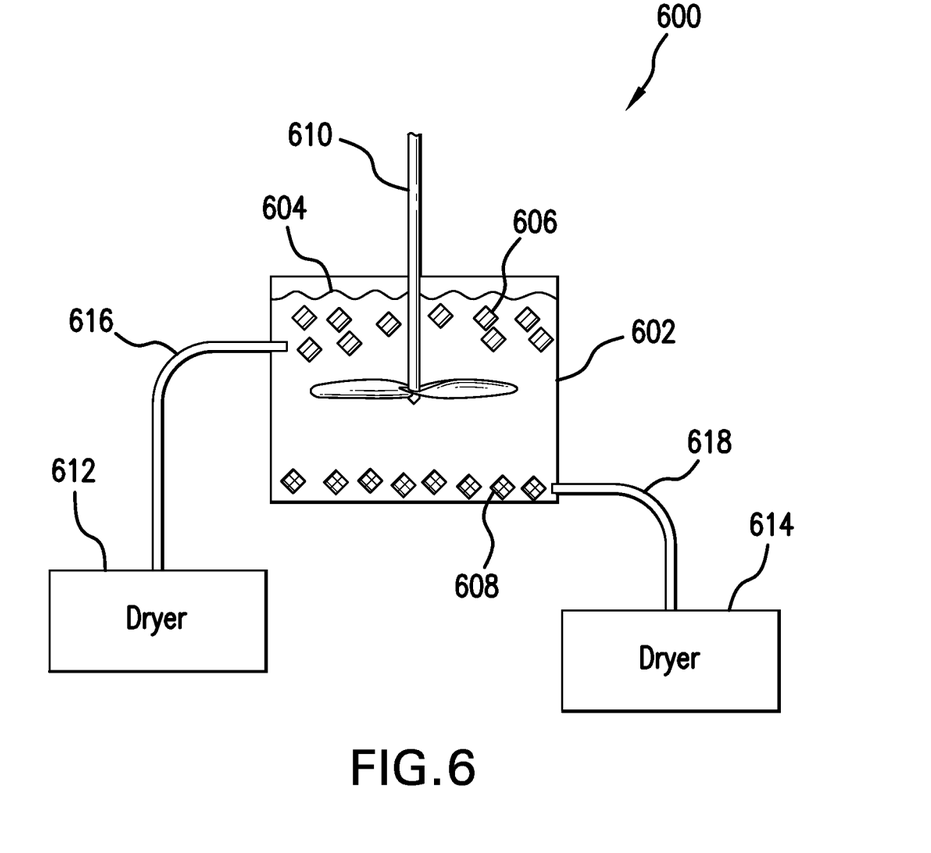
FIG. 6 shows particles of a pulverized golf ball being separated.
Figure 7:
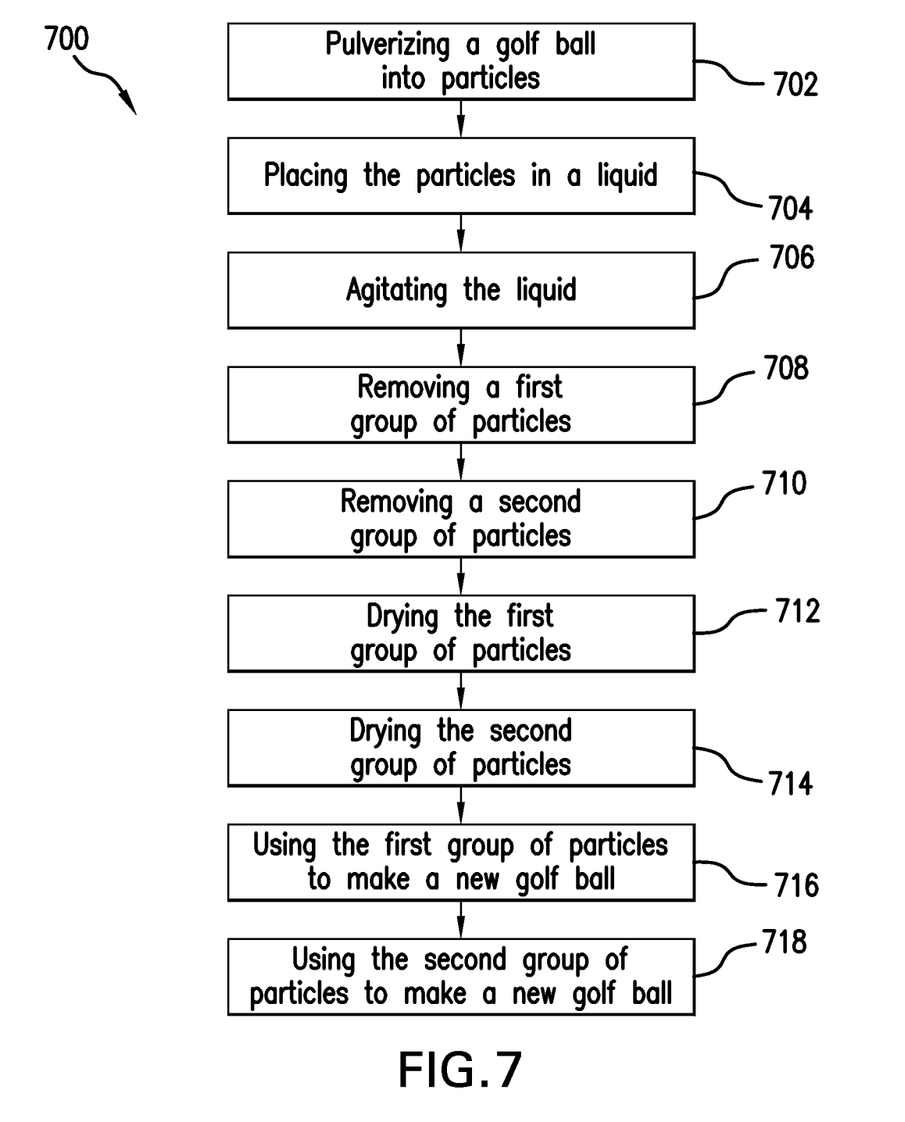
FIG. 7 is a flow chart showing a method of recycling a golf ball according to an exemplary embodiment.

FIG. 7 is a flowchart showing an exemplary method 700 of recycling a golf ball. The same golf ball made through method 200 may be recycled by method 700. The following discussion describes performing the steps of method 700 to recycle a single golf ball. However, it is understood that the steps of method 700 may be performed to recycle multiple golf balls at one time. FIG. 6 shows equipment 600 that may be used to perform method 700. Equipment 600 may include a vessel 602, a propeller 610, a first dryer 612, and a second dryer 614. Vessel 602 may include any type of vessel suitable for holding a liquid. For example, vessel 602 may be a tank. The type of vessel may be selected based on a variety of factors. For example, the type of vessel may be selected based on the amount of liquid to be held by the vessel and/or the environment in which the vessel is to be stored. Vessel 602 may be connected to first dryer 612 by a first tube 616. First tube 616 and second tube 618 may be connected to outlets disposed within vessel 602 such that first tube 616 and second tube 618 are each in fluid communication with vessel 602. First tube 616 may be connected to vessel 602 at a first level. Vessel 602 may be connected to second dryer 614 by a second tube 618. Second tube 618 may be connected to vessel 602 at a second level. While the exemplary embodiment of FIG. 6 includes only two tubes and two dryers, it is understood that more tubes and dryers may be included. Propeller 610 may be spun to agitate liquid and particles within vessel 602. While the exemplary embodiment of FIG. 6 may include a propeller, any other type mechanism may be provided to agitate the liquid inside vessel 602. Similarly, more than one mechanism may be provided to agitate the liquid inside vessel 602. The type of mechanism and the number of mechanisms may be selected based on a variety of factors. For example, the type of mechanism and the number of mechanisms may be selected based on the type of liquid used and/or the material of the particles. First dryer 612 and/or second dryer 614 may include any type of dryer suitable for drying particles of golf ball material. For example, CONAIR RESINWORKS Systems offer dehumidifying dryers for drying resin materials. The type of dryer may be selected based on a variety of factors. For example, the type of dryer may be selected based on the type of liquid used and/or the material of the particles.

In some embodiments, method 700 may include a step 702 of pulverizing a golf ball into particles, granules, and/or pellets. Step 702 may be performed by any type of equipment known to those skilled in the art. For example, a Cumberland A Series 1000X granulator may be used to pulverize a golf ball into particles, granules, and/or pellets. The type of equipment used to pulverize the golf ball may be selected based on a variety of factors. For example, the type of equipment may be selected based on the material of the layers of the golf ball. In some embodiments, cover layer 140 may be removed before performing step 702. For example, cover layer 140 may be ground off of mantle layer 130. In such embodiments, the remaining layers of the golf ball may be pulverized during step 702. For example, mantle layer 130 and core layer 120 may be pulverized during step 702. In other embodiments, step 702 may include pulverizing the entire golf ball without removing any layers first. In yet other embodiments, multiple layers of the golf ball may be removed before performing step 702. For example, in some embodiments, a golf ball may have four or five layers and two outer layers may be removed before performing step 702.

In some embodiments, method 700 may include a step 704 of placing the particles made during step 702 in a liquid 604 having a certain known density. Liquid 604 may be held in vessel 602. The type of liquid and the amount of liquid may be selected based on a variety of factors. For example, liquid 604 may be selected based on the density of the liquid, the shape and size of the vessel, and/or the density of the pulverized particles of golf ball material. In other words, liquid 604 may be selected based on the levels the particles will float to within the liquid. This way, the particles can be separated based on the level to which the particles float in liquid 604. Liquid 604 may include a combination of liquids. In some embodiments, the temperature of the liquid may be changed to alter the density of the liquid, thereby altering the level to which the particles float. Similarly, the type of liquid may be changed to alter the density of the liquid. For example, in some embodiments, salt may be added to water to change the density of the water.

FIG. 6 shows how the particles may settle in liquid 604. In the embodiment shown in FIG. 6, cover layer 140 may have been removed from golf ball 100 prior to performing step 702. Thus, only particles of mantle layer material and particles of core layer material may be pulverized during step 702 and may be present in vessel 602. The first level of particles 606 may include a first group of particles. The first group of particles may include the material having the lowest density, which may be more buoyant in the liquid. As shown in FIG. 6, in some embodiments, the first level of particles 606 may float to the top of the liquid level. The second level of particles 608 may include a second group of particles. The second group of particles may include the material having the highest density, which may sink to the bottom of vessel 602.

While the exemplary embodiment shows two levels of particles, it is understood that the number of levels may include as many levels as there are types of materials. For example, in some embodiments, a golf ball made of four materials each having different densities may be pulverized in step 702 and the pulverized particles may be placed in liquid in step 704. The four materials may float to four different layers. In another example, in some embodiments, multiple golf balls each having different combinations of materials may be pulverized in step 702 and then placed in liquid in step 704. In this example, a first set of golf balls may be made of materials A, B, C and D, each having a different density, and second set of golf balls may be made of materials A and E, each having a different density. Since the two sets of golf balls combined are made of materials A, B, C, D, and E, the particles may float to five different levels in the liquid.

In some embodiments, method 700 may include step 706 of agitating the liquid. Step 706 may help separate particles that may be stuck together, thereby aiding in separating the first group of particles from the second group of particles. For example, step 706 may include spinning propeller 610 to agitate the liquid and particles, thereby separating particles that may be stuck together. It is understood that step 706 may be performed by any equipment suitable for agitating the liquid and particles. For example, step 706 may be performed by stirring the liquid with a paddle.

In some embodiments, method 700 may include a step 708 of removing the first group of particles. Step 708 may include removing the first group of particles while keeping the first group of particles separate from the second group of particles. In some embodiments, step 708 may be performed by feeding the first group of particles into first tube 616. For example, the first group of particles may be suctioned into first tube 616. In some embodiments, the first group of particles may be skimmed from the top of liquid. For example, in some embodiments, vessel 602 may not be connected to tubes and the particles may be removed without using tubes.

In some embodiments, method 700 may include a step 710 of removing a second group of particles. Step 710 may include removing the second group of particles while keeping the second group of particles separate from the first group of particles. In some embodiments, step 710 may be performed by feeding the second group of particles into second tube 618. For example, the second group of particles may be suctioned into second tube 618. In some embodiments, step 708 may be performed before step 710. Thus, the second group of particles may be the only particles remaining in the liquid before step 710 is performed. Step 710 may include skimming and/or straining the second group of particles from the liquid. For example, in some embodiments, vessel 602 may not be connected to tubes and the particles may be removed without using tubes. In some embodiments, liquid 604 may be poured over a sieve to strain out the second group of particles. In embodiments in which more than two materials are to be separated, step 710 may be repeated for each remaining material.

In some embodiments, method 700 may include a step 712 of drying the first group of particles. In some embodiments, step 712 may include using first tube 616 to transport the first group of particles to first dryer 612. In some embodiments, step 712 may include using first dryer 612 to dry the first group of particles. In some embodiments, step 712 may be performed by twin screws disposed within a tube. In such embodiments, the twin screws may be twisted to move the first group of particles along inside the tube and to dry the particles through heat generated by friction caused by moving the twin screws against the particles. For example, step 712 may be performed by the twin screws described in U.S. Patent Application Publication No. 2013/0320576, entitled Method of Recycling a Golf Ball, published on Dec. 5, 2013, the entirety of which is hereby incorporated by reference.

In some embodiments, method 700 may include a step 714 of drying the second group of particles. In some embodiments, step 714 may include using second tube 618 to transport the second group of particles to second dryer 614. In some embodiments, step 714 may include using second dryer 614 to dry the first group of particles. In some embodiments, step 714 may be performed by twin screws disposed inside a tube. In such embodiments, the twin screws may be twisted to move the second group of particles along inside the tube and to dry the particles through heat generated by friction caused by moving the twin screws against the particles. For example, step 714 may be performed by the twin screws described in U.S. Patent Application Publication No. 2013/0320576, entitled Method of Recycling a Golf Ball, published on Dec. 5, 2013, the entirety of which is hereby incorporated by reference.

Method 700 may include step 716 of using the first group of particles to make a new golf ball. For example, in some embodiments, the first group of particles may be mixed with new, unused particles of material. The combination of the first group of particles and the new, unused particles of material may be used in method 200 to form a layer of a new golf ball. In some embodiments, the new, unused particles of material mixed with the first group of particles may include the same type of material as the first group of particles. In some embodiments, the new, unused particles of material mixed with the first group of particles may include a different type of material from the first group of particles.

Method 700 may include step 718 of using the second group of particles to make a new golf ball. For example, in some embodiments, the second group of particles may be mixed with new, unused particles of material. The combination of the second group of particles and the new, unused particles of material may be used in method 200 to form a layer of a new golf ball. In some embodiments, the new, unused particles of material mixed with the second group of particles may include the same type of material as the second group of particles. In some embodiments, the new, unused particles of material mixed with the second group of particles may include a different type of material from the second group of particles.

It is understood that any of the steps of method 700 may be performed in any order. For example, step 712 may be performed at the same time as step 714. In another example, step 712 may be performed before step 714.

In some embodiments, method 700 may be performed with the components and/or in the manner disclosed in Molinari, U.S. patent application Ser. No. 13/483,718 (client matter number 72-1601), entitled Method Of Recycling A Ball And Ball For Use In Recycling Method, filed on May 30, 2012, the entirety of which is hereby incorporated by reference.

In some embodiments, golf ball 100 may be made to include a trace element, or unique identifier, as disclosed in Ishii et al., U.S. patent application Ser. No. 13/018,007 published as U.S. Patent Application Publication No. 2012/0197812 entitled System and Method for Collecting, Recycling, and Tracking Products such as Golf Balls, filed on Jan. 31, 2011, the entirety of which is hereby incorporated by reference. A trace element may comprise any appropriate identifying means such as an optical machine-readable representation of data, one example of which is a barcode; an RFID chip or other like means. For example, method 200 may include a step of attaching a trace element to golf ball 100. In some embodiments, the method for incentivizing the collection and recycling of products disclosed in U.S. patent application Ser. No. 13/018,007 may be performed in addition to the methods disclosed herein. The method for incentivizing the collection and recycling of products may include a step of selling golf balls, including one or more golf balls identical to golf ball 100. The method may further include a step of collecting one or more sold golf balls. If the collected golf ball(s) includes a trace element, the trace element may be scanned or read. This trace element data may then be input into a Recycling Incentive and Tracking Program (RIT), for data storage and further processing. An incentive award may be provided to a user based upon the information stored within the RIT program. The collected golf balls may be processed for recycling. This step may encompass many possible actions such as counting and sorting; separating by condition of product; separating by original manufacturer. Each of the sorting factors can be used to direct the collected products into designations such as routing for disassembly and recycling of materials and components for re-manufacture of products that are like or unlike the original collected products; or routing for re-use designations. In some embodiments, method 700 may be performed in place of or in addition to processing the collected golf balls for recycling. The method of incentivizing may include a step of determining the intended designation for recycled material from the golf ball (s), feeding data regarding the intended designation into the RIT program, and providing the intended designation to a user via a network.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of making a golf ball, comprising: pulverizing a golf ball into particles, wherein the golf ball has at least three layers, wherein each layer has a density different from all other layers; placing the particles into a liquid and agitating the liquid and particles using a propeller to separate particles of a first group from particles of a second group and causing the first group of particles to settle at a first level in the liquid and the second group of particles to settle at a second level in the liquid that is different from the first level, wherein the propeller is located between the first level and the second level, and wherein the first group of particles are of a material having a different density than the density of the material of the second group of particles; and using at least a portion of one of the first group of particles and the second group of particles to form a new golf ball.

2. The method of making a golf ball according to claim 1, further comprising: removing the first group of particles from the liquid while keeping the first group of particles separate from the second group of particles; and storing the first group of particles separately from the second group of particles.

3. The method of making a golf ball according to claim 2, wherein the first group of particles are removed by suction.

4. The method of making a golf ball according to claim 3, further comprising: drying the first group of particles; and drying the second group of particles.

5. A method of making a golf ball, comprising: pulverizing a used golf ball into particles, wherein the used golf ball has at least three layers, wherein each layer has a density different from all other layers; placing the particles into a liquid and agitating the liquid and particles using a propeller to separate particles of a first group from particles of a second group and causing the first group of particles to settle at a first level in the liquid and the second group of particles to settle at a second level in the liquid that is different from the first level, wherein the propeller is located between the first level and the second level, and wherein the first group of particles are of a material having a different density than the density of the material of the second group of particles; removing the first group of particles from the liquid while keeping the first group of particles separate from the second group of particles; removing the second group of particles from the liquid while keeping the second group of particles separate from the first group of particles; and using at least a portion of one of the first group of particles and the second group of particles to form a new golf ball.

6. The method of making a golf ball according to claim 5, wherein the step of using at least a portion of one of the first group of particles and the second group of particles to form a new golf ball includes delivering a portion of the first group of particles a first heating chamber and heating the portion of the first group of particles, thereby melting the portion of the first group of particles into a first molten material and injecting the first molten material into a mold chamber, thereby forming a cover layer.

7. The method of making a golf ball according to claim 6, wherein the step of using at least a portion of one of the first group of particles and the second group of particles to form a new golf ball includes delivering a portion of the second group of particles a second heating chamber and heating the portion of the second group of particles, thereby melting the portion of the second group of particles into a second molten material and injecting the second molten material into a mold chamber, thereby forming a mantle layer within the cover layer.

8. The method of making a golf ball according to claim 5, wherein the step of removing the first group of particles includes skimming the first group of particles from the liquid.

9. The method of making a golf ball according to claim 5, wherein the step of removing the first group of particles includes suctioning the first group of particles from a vessel into a dryer.

10. The method of making a golf ball according to claim 7, wherein the step of using at least a portion of one of the first group of particles and the second group of particles to form a new golf ball includes injecting a third molten material into the mold chamber, thereby forming a core layer within the mantle layer.

11. A method of making a golf ball, comprising: selling a golf ball having a trace element comprising a barcode to a consumer, wherein the golf ball has at least three layers, wherein each layer has a density different from all other layers; collecting the golf ball; inputting the trace element data into a computer program; calculating with the computer program an incentive award associated with the collected golf ball; communicating the award to a user; pulverizing the collected golf ball into particles; separating the particles of the collected golf ball into a first group of particles and a second group of particles; and using at least a portion of one of the first group of particles and the second group of particles to form a new golf ball, wherein separating the particles includes: placing the particles into a liquid and agitating the liquid and particles using a propeller to separate particles of a first group from particles of a second group and causing the first group of particles to settle at a first level and the second group of particles to settle at a second level that is different from the first level, wherein the propeller is located between the first level and the second level, and wherein the first group of particles are of a material having a different density than the density of the material of the second group of particles; removing the first group of particles while keeping the first group of particles separate from the second group of particles; and removing the second group of particles while keeping the second group of particles separate from the first group of particles.

12. The method of making a golf ball according to claim 1, wherein the at least three layers comprise a core layer having a density of 0.96 g/cm$^3$, a mantle layer having a density of from about 1.1 g/cm$^3$ to about 1.35 g/cm$^3$, and a cover layer having a density of from about 1.1 g/cm$^3$ to about 1.35 g/cm$^3$.

13. The method of making a golf ball according to claim 5, wherein the at least three layers comprise a core layer having a density of 0.96 g/cm$^3$, a mantle layer having a density of from about 1.1 g/cm$^3$ to about 1.35 g/cm$^3$, and a cover layer having a density of from about 1.1 g/cm$^3$ to about 1.35 g/cm$^3$.

14. The method of making a golf ball according to claim 11, wherein the at least three layers comprise a core layer having a density of 0.96 g/cm$^3$, a mantle layer having a density of from about 1.1 g/cm$^3$ to about 1.35 g/cm$^3$, and a cover layer having a density of from about 1.1 g/cm$^3$ to about 1.35 g/cm$^3$.

\* \* \* \* \*